US006339929B1

(12) United States Patent
Udagawa et al.

(10) Patent No.: US 6,339,929 B1
(45) Date of Patent: Jan. 22, 2002

(54) SWIVEL CONTROL APPARATUS

(75) Inventors: Tsutomu Udagawa; Teruo Igarashi, both of Ibaraki; Masami Ochiai, Atsugi; Toshimi Sakai, Ibaraki; Kazuhisa Ishida, Tsuchiura; Kouji Funato, Ibaraki, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/625,416

(22) Filed: Jul. 25, 2000

Related U.S. Application Data

(63) Continuation of application No. PCT/JP99/06606, filed on Nov. 26, 1999.

(30) Foreign Application Priority Data

Nov. 27, 1998 (JP) .......................................... 10-337559

(51) Int. Cl.[7] ............................................... F16D 31/02
(52) U.S. Cl. ........................................... 60/468; 60/469
(58) Field of Search .......................... 60/468, 493, 469, 60/494

(56) References Cited

U.S. PATENT DOCUMENTS

| | | | | |
|---|---|---|---|---|
| 4,194,365 A | * | 3/1980 | Stouffet et al. | 60/493 |
| 4,586,332 A | * | 5/1986 | Schexnayder | 60/493 |
| 5,046,312 A | * | 9/1991 | Tsuda et al. | 6/493 |
| 5,159,813 A | * | 11/1992 | Yoshimatsu et al. | 60/468 |
| 5,285,643 A | * | 2/1994 | Hirata et al. | 60/468 |
| 5,419,132 A | * | 5/1995 | Sato et al. | 60/468 |
| 5,709,083 A | * | 1/1998 | Sorbel et al. | 60/468 |

FOREIGN PATENT DOCUMENTS

| | | |
|---|---|---|
| DE | 44 10 976 A1 | 10/1994 |
| JP | A-58-41127 | 3/1983 |
| JP | 61-112068 | 7/1986 |
| JP | A-2-76907 | 3/1990 |
| JP | A-6-280814 | 10/1994 |
| JP | U-7-41002D | 7/1995 |
| JP | B2-2547441 | 8/1996 |
| JP | Y2-2549420 | 6/1997 |
| JP | A-10-110703 | 4/1998 |
| JP | A-10-246205 | 9/1998 |

* cited by examiner

*Primary Examiner*—F. Daniel Lopez
*Assistant Examiner*—Igor Kershteyn
(74) *Attorney, Agent, or Firm*—Oliff & Berridge, PLC

(57) ABSTRACT

A swivel control apparatus according to the present invention , includes: a hydraulic pump; a hydraulic motor for swiveling which is driven by hydraulic oil emitted from the hydraulic pump; a control valve which controls a flow of hydraulic oil which is supplied from the hydraulic pump to the hydraulic motor for swiveling, and at a neutral position of the control valve cuts off from one another a pair of ports which communicate to input and output ports of the hydraulic motor; a valve device which communicates and cuts off from one another a pair of conduits which are respectively connected to the input and output ports of the hydraulic motor for swiveling; a pressure detection device which detects respective pressures in the two conduits and outputs pressure signals; a rotational speed detection device which detects a physical quantity based upon a rotational speed of the hydraulic motor for swiveling and outputs a rotational speed signal; a mode selection device which selects a neutral brake mode and a neutral free mode; and a control device which controls driving of the valve device so as to cut off the two conduits from one another when the neutral brake mode is selected, and so as to communicate the two conduits based upon the pressure signals and the rotational speed signal when the neutral free mode is selected.

8 Claims, 7 Drawing Sheets

SWIVEL CONTROL APPARATUS

This application is a continuation of PCT Application No. PCT/JP99/06606 filed on Nov. 26, 1999.

This application is based upon Japanese Patent Application No. 337559 of Heisei 10, filed Nov. 27, 1998, and its contents are incorporated herein by reference.

TECHNICAL FIELD

The present invention relates to a swivel control apparatus for a construction machine such as a crane or the like.

BACKGROUND ART

In a control system for swiveling, in the past, there is a mode (termed the "neutral free mode") in which the motor is rotated by the inertia of the swiveling body when the operating lever has been returned to neutral; and there is a mode (termed the "neutral brake mode") in which the rotation of the motor is stopped when the operating lever has been returned to neutral. It is desirable for the use of these modes to be separated according to the nature of the job, and for example in Japanese Patent Publication Serial No. 2,549, 420 there is disclosed an apparatus with which either of these modes can be selected with one machine. With the apparatus of this publication, respective relief valves are provided to conduits connected to the input and output ports of the hydraulic motor, and a relationship between the amount of actuation of the operating lever and the relief pressures of the relief valves are made into patterns and established in advance for each of the neutral free and neutral brake modes. It is possible to control the driving of the swiveling body in correspondence with each of the neutral free/neutral brake modes by controlling the relief valves in accordance with these characteristics (patterns) of relief pressure.

DISCLOSURE OF THE INVENTION

The above described characteristics of the relief valves of the apparatus described in the above publication are set so that the amounts of change of the relief pressure become greater in accompaniment with increase of the actuation amount of the operating lever, and since the relief valve is controlled in accordance with these characteristics, even in the case that the operating lever is actuated for deceleration by exactly the same amount, according to the position from which the operating lever was actuated, the amounts of change of the relief pressures vary. In other words, although the relief pressures vary greatly in positions in which the slopes of the characteristics are large, the relief pressures vary hardly at all in positions in which the slopes of the characteristics are small. As a result great differences occur in the deceleration of the motor due to the position of the operating lever, even if the operating lever is operated for deceleration by exactly the same amount, and operation becomes difficult from the point of view of the operator.

Further, with the apparatus described in the above publication, a plurality of different relief characteristics are set for the relief valves according to the direction of actuation of the operating lever, the direction of rotation of the motor, and whichever of the neutral free/neutral brake modes is established, and for this reason the control algorithm becomes complicated. In the above publication an apparatus is disclosed in which one relief valve is provided in order to simplify the control algorithm, but in this case the problem arises that, even in the neutral free mode, a large braking pressure is generated due to the actuation region of deceleration actuation of the operating lever.

The objective of this invention is to provide a swivel control apparatus which can most suitably realize the neutral free mode and the neutral brake mode by a simple construction.

In order to attain the above object, a swivel control apparatus according to the present invention , comprises: a hydraulic pump; a hydraulic motor for swiveling which is driven by hydraulic oil emitted from the hydraulic pump; a control valve which controls a flow of hydraulic oil which is supplied from the hydraulic pump to the hydraulic motor for swiveling, and at a neutral position of the control valve cuts off from one another a pair of ports which communicate to input and output ports of the hydraulic motor; a valve device which communicates and cuts off from one another a pair of conduits which are respectively connected to the input and output ports of the hydraulic motor for swiveling; a pressure detection device which detects respective pressures in the two conduits and outputs pressure signals; a rotational speed detection device which detects a physical quantity based upon a rotational speed of the hydraulic motor for swiveling and outputs a rotational speed signal; a mode selection device which selects a neutral brake mode and a neutral free mode; and a control device which controls driving of the valve device so as to cut off the two conduits from one another when the neutral brake mode is selected, and so as to communicate the two conduits based upon the pressure signals and the rotational speed signal when the neutral free mode is selected.

In this swivel control, it is preferred that the control device calculates a direction of action of hydraulic oil upon the hydraulic motor based upon the pressure signals, calculates a rotational direction of the hydraulic motor based upon the rotational speed signal, and controls the driving of the valve device so as to communicate the two conduits when the neutral free mode is selected and the calculated direction of action of hydraulic oil upon the hydraulic motor and the rotational direction of the hydraulic motor are different. In this case, it is preferred that the control device calculates a target flow amount based upon the rotational speed signal and controls the driving of the valve device so that the target flow amount flows from one of the conduits to the other of the conduits. In addition, it is preferred that a deceleration ratio setting device which sets a deceleration ratio for the hydraulic motor for swiveling is further provided, and the control device calculates the target flow amount based upon a set value from the deceleration ratio setting device. Or it is preferred that the control device controls the driving of the valve device based upon a conversion table that is predetermined to obtain a value of a control signal for the valve device based upon the target flow amount. Or it is preferred that the target flow amount is assumed as a value for a flow amount passing through an orifice, a differential pressure between the two conduits detected by the pressure detection device is assumed as a value for a differential pressure of orifice, and the control device calculates an opening amount of orifice by substituting the assumed values into an equation based upon the orifice equation, and controls the driving of the valve device based upon a control signal corresponding to the calculated opening amount of orifice.

It is preferred that the valve device described above is an electromagnetic proportional valve and is controlled so as to be closed when the neutral brake mode is selected and so as to be opened with a predetermined opening area when the neutral free mode is selected.

A hydraulic swiveling type of crane according to the present invention comprises: a traveling body; a swiveling body that is mounted upon the traveling body to be able to swing; and the above described swivel control apparatus that controls swiveling of the swiveling body.

As described above, in the present invention, the valve apparatus which communicates together and cuts off from one another a pair of conduits which are respectively connected to the input and output ports of the hydraulic motor for swiveling is provided, in the neutral brake mode the two conduits are cut off from one another, and in the neutral free mode the two conduits are communicated based upon the pressure signals and the rotational speed signal, therefore it is possible to realize a suitable one of the neutral free/neutral brake states without any dependence upon the actuation position of the operating lever. The control algorithm becomes simplified compared with one in which each of the neutral free/neutral brake states is realized according to the predetermined patterns. In particular, since the target flow amount that is calculated based upon the rotational speed signal flows from one of the conduits to the other of the conduits, the speed control of the swiveling body can be performed accurately. Furthermore, since it is possible to set the deceleration ratio of the hydraulic motor for swiveling, therefore in the neutral free mode it is possible to alter the deceleration of the swiveling body to any value, and the convenience of use is enhanced.

Furthermore, since the conversion table that is predetermined to obtain a value of a control signal for the valve device based upon the target flow amount is used, the control can be implemented easily and the high speed of control can be achieved. And various types of empirical or experimental values can be used for the conversion table. On the other hand, in case that the equation based upon the orifice equation is used, the amount of memory where the conversion table is stored can be reduced. In addition, the target opening amount is calculated in consideration of not only the target flow amount but also the differential pressure, the target flow amount can be controlled with high accuracy. Also, the hydraulic swiveling type of crane can have above advantages.

BEST MODE FOR CARRYING OUT THE INVENTION

The embodiments of this invention will be described in the following with reference to the drawings.

The first embodiment

Figure 1:
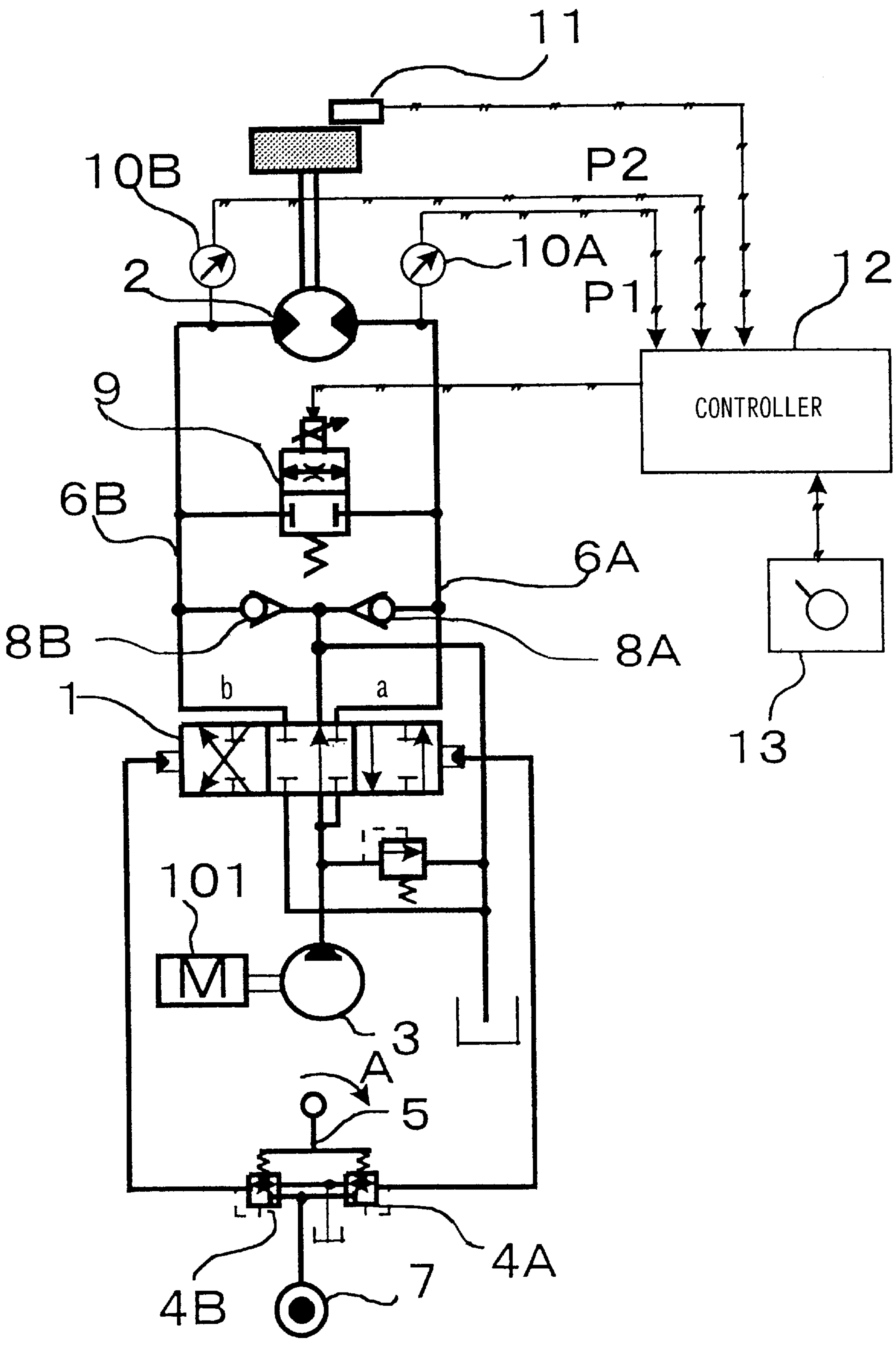
FIG. 1 shows a hydraulic circuit diagram of a hydraulic control apparatus according to an embodiment of this invention.
Figure 2:
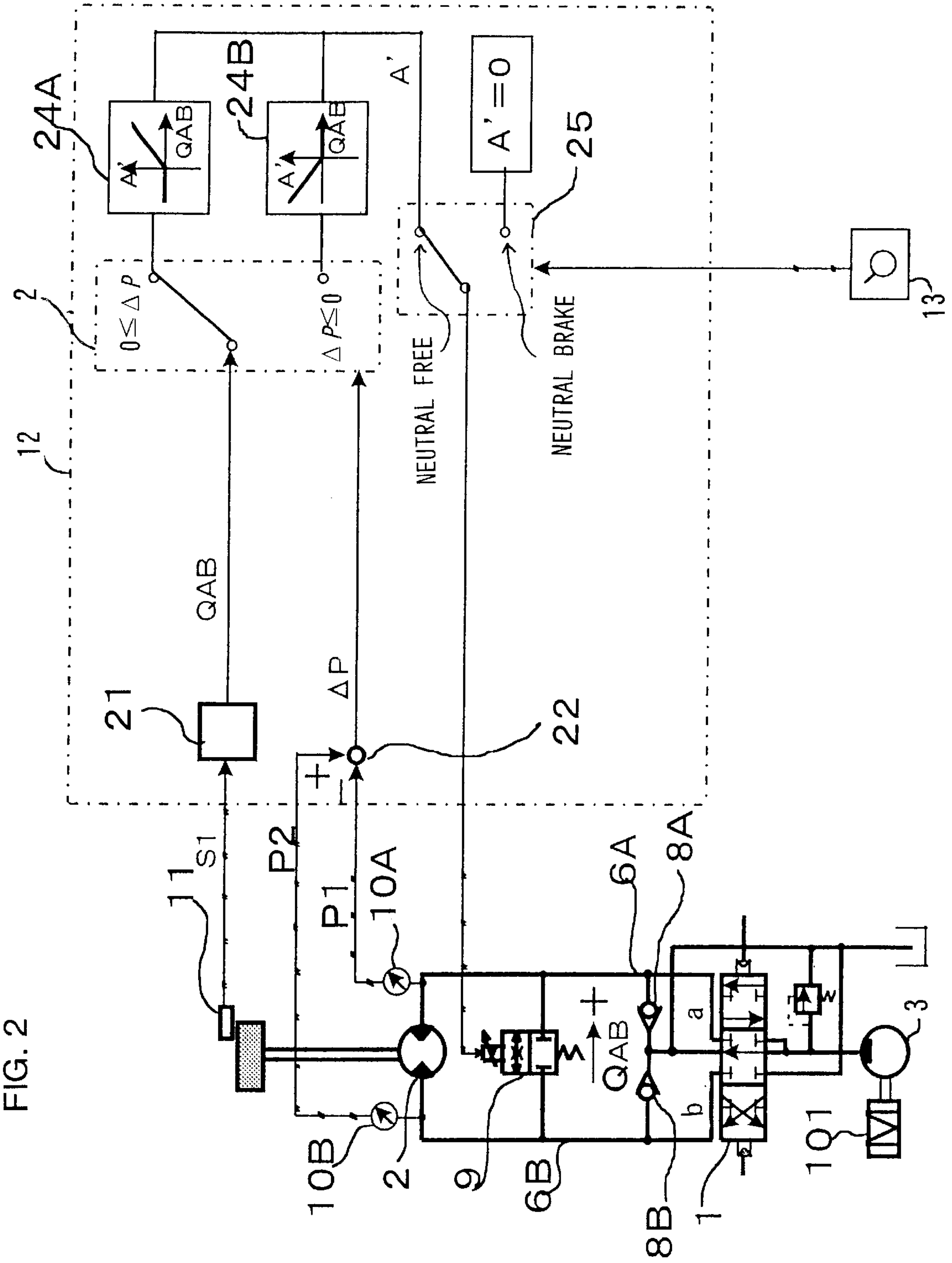
FIG. 2 shows the detailed construction of a control section of a swivel control apparatus according to a first embodiment.
Figure 3:
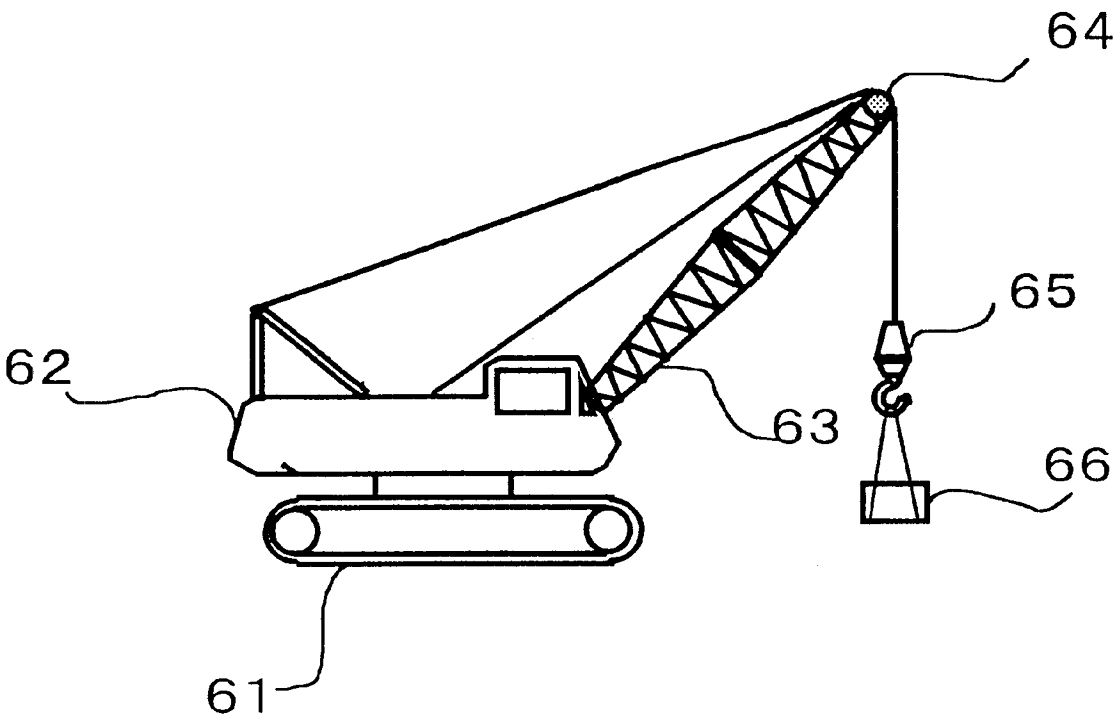
FIG. 3 shows a general constructional view of a crane to which this invention is applied.

FIG. 1 is a hydraulic circuit diagram showing the construction of a hydraulic control apparatus (a swivel control apparatus) according to embodiments of this invention; FIG. 2 is a figure showing the detailed construction of a control section (a controller 12 which will be described hereinafter) of the hydraulic control apparatus according to the first embodiment; and FIG. 3 is a side view of the construction of a crane in which the hydraulic control apparatus according to this embodiment is used. The movable crane shown in FIG. 3 is made up of a travelling body 61, a swiveling body 62 which is carried upon the travelling body 61 and can swivel, and a boom 63 which is supported upon the swivelling body 62 and can be raised and lowered; and a hanging load 66 is held up by a hook 65 which is connected to a wire rope, via a sheave 64 which is provided at the end of the boom 63.

As shown in FIG. 1, a hydraulic circuit for swiveling of the swiveling body 62 of this movable crane consists of a hydraulic pump 3 which is driven by a motor 101, a hydraulic motor for swiveling 2 which is driven by hydraulic oil ejected from the hydraulic pump 3, a direction control valve for swiveling 1 which controls the flow of hydraulic oil supplied from the hydraulic pump 3 to the hydraulic motor for swiveling 2 and in neutral cuts off a pair of ports which connect to output and input ports of the hydraulic motor 2, an operating lever 5 with which the operator inputs commands for swiveling, pilot valves 4A and 4B controlled by the operating lever 5, two conduits 6A and 6B which are connected to the input and output ports of the hydraulic motor for swiveling 2, a pilot hydraulic oil source 7 which supplies hydraulic oil to the pilot valves 4A and 4B, check valves 8A and 8B which are connected between a center port of the direction control valve for swiveling 1 and the conduits 6A and 6B, an electromagnetic proportional flow amount control valve 9 (hereinafter termed an electromagnetic proportional valve) which, via a throttle, communicates the two conduits 6A and 6B together or cuts them off from one another, pressure sensors 10A and 10B which output pressure signals P1 and P2 which measure the hydraulic oil pressures in the conduits 6A and 6B, a rotational speed sensor 11 which detects a rotational speed of the swiveling body 62 which is proportional to the speed of swiveling and outputs a signal Si which is positive in the case of forward rotation and minus in the case of reverse rotation, a mode selection switch 13 which selects either a neutral free mode or a neutral brake mode, and a controller 12 which controls the valve opening amount (the throttling cross section) of the electromagnetic proportional valve 9. As described above, the direction control valve for swiveling 1 does not connect together the conduit 6A and the conduit 6B but cuts off them in the neutral position Now the neutral free and the neutral brake modes will be explained. The neutral free mode is a mode in which driving torque is generated in the operating direction of the operating lever 5 and the hydraulic motor 2 is driven, and in this mode even if the operating lever 5 is returned to the neutral position braking force other than swiveling resistance does not act upon the hydraulic motor 2, and the swiveling body 62 rotates by inertial force. This kind of mode is suitable when, for example, the swinging of a suspended load is to be reduced. Further, the neutral brake mode is a mode in which the hydraulic motor 2 is driven according to the amount of actuation of the operating lever 5, and in this mode, when the operating lever 5 is returned to the neutral position, hydraulic braking force acts upon the hydraulic motor 2, and rotation of the swiveling body 62 is prevented.

Figure 4A:
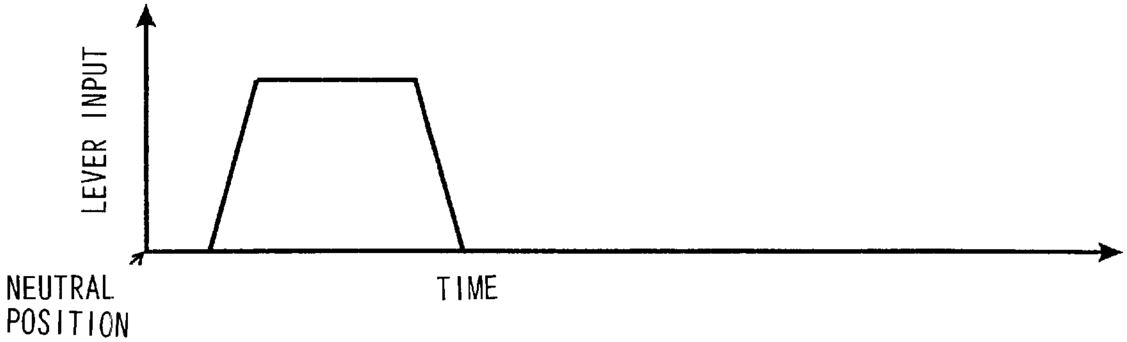
FIGS. 4A and 4B shows an example of swiveling speed versus operating lever input for each of the neutral free and the neutral brake modes.
Figure 4B:
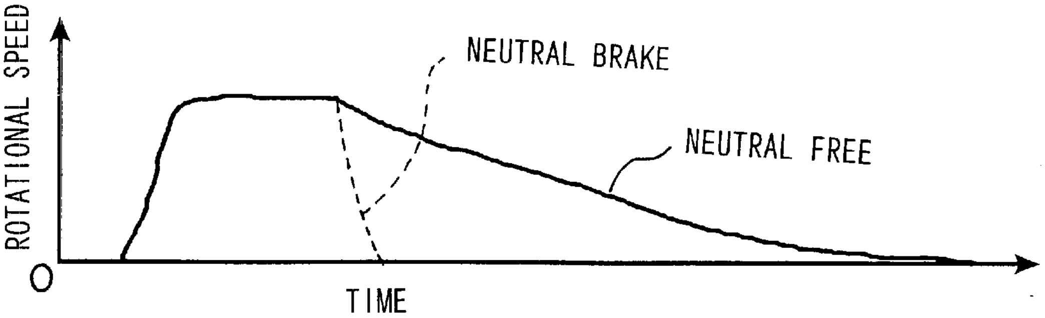

This kind of mode is suitable when, for example, minute positional adjustment of the swiveling body is to be performed. It is to be noted that the neutral free/neutral brake actuation states are exemplarily shown in FIGS. 4A and 4B. FIG. 4A shows the input state of the operating lever 5 from the neutral position, while FIG. 4B shows the respective swivel speeds for each mode corresponding to this input state. In this embodiment, during the neutral brake mode braking force acts upon the hydraulic motor 2 by the electromagnetic proportional valve 9 closing and interrupting communication between the conduits 6A and 6B, while during the neutral free mode the hydraulic motor 2 rotates by inertial force by the electromagnetic proportional valve 9 opening and permitting communication between the conduits 6A and 6B. In the following this point will be explained in detail.

As shown in FIG. 2, the controller 12 comprises: a flow amount calculation device 21 which inputs a rotational speed signal S1 from the rotational speed sensor 11 and multiplies it by a predetermined speed reduction ratio $\alpha$ (it is supposed in this embodiment that $\alpha=1$) and a displacement amount q for one revolution of the hydraulic motor 2, so as to calculate a flow amount QAB ($=S1\times\alpha\times q$ : in the following, this will be termed the target flow amount) passing the electromagnetic proportional valve 9; a subtraction device 22 which inputs the pressure signals P1 and P2 and subtracts P1 from the pressure signal P2 so as to calculate a differential signal $\Delta P$ ($=P2-P1$); a sign determination device 23 which determines the sign of the differential signal $\Delta P$; conversion tables 24A and 24B which convert the target flow amount QAB into a control signal A', using previously provided correspondence tables between target flow amounts QAB and control signals A'; and a mode determination device 25 which discriminates the signal from the mode changeover switch 13, and when the neutral free mode is selected outputs the control signal A' just as it is to the solenoid of the electromagnetic proportional valve 9, while when the neutral brake mode is selected outputs a control signal A' equal to 0. The valve characteristic of the electromagnetic proportional valve 9 is set so that the valve opening amount increases along with increase of the control signal A' from the controller 12, while it closes the valve with a control signal A'=0. Further, in the region of the conversion table 24A in which the target flow amount QAB $\leqq 0$, and in the region of the conversion table 24B in which the target flow amount QAB $\geqq 0$, processing is performed so as to bring the control signal A' equal to 0 as a limit.

Next, the operation of this first embodiment will be explained. Moreover, in the following explanation, it will be postulated that the direction in which the hydraulic motor 2 rotates due to hydraulic oil from the conduit 6A is the forward rotational direction, while the direction in which the hydraulic motor 2 rotates due to hydraulic oil from the conduit 6B is the reverse rotational direction.

(1) Neutral Brake Mode

When the neutral brake mode is selected by the mode changeover switch 13, a control signal A'=0 is output to the solenoid of the electromagnetic proportional valve 9 by the previously described mode determination device 25, and the electromagnetic proportional valve 9 is closed so as to prevent communication between the conduits 6A and 6B. Here, when an attempt is made to rotate the swiveling body 62 forward and the operating lever 5 is actuated to drive it towards the forward rotation side, the pilot valve 4A is driven according to this amount of actuation, and the hydraulic oil from the pilot hydraulic oil source 7 (the pilot pressure) is supplied to the pilot port of the direction control valve 1 via the pilot valve 4A. When this is done, the direction control valve 1 is changed over to its position (a), and hydraulic oil from the hydraulic pump 3 is supplied to the hydraulic motor 2 via the direction control valve 1 and the conduit 6A. Due to this, the hydraulic motor 2 rotates in the forward rotational direction, and the swiveling body 62 is driven at a speed according to the amount of actuation of the operating lever 5.

When the operating lever 5 is actuated to drive it to the neutral side so as to decelerate the swiveling body 62, the pilot pressure is reduced in accordance with the amount of this operation, and the direction control valve 1 is driven towards the neutral side. Due to this, the throttling due to the direction control valve 1 (the meter-out throttling) is closed down, and the pressure in the conduit 6B increases which generates braking pressure, so that the rotation of the swiveling body 62 is decelerated. When the operating lever 5 has completely returned to the neutral position, the conduits 6A and 6B are blocked off from the hydraulic pump 3 and the tank, and as shown by the dotted line in FIG. 4B the rotation of the swiveling body 62 is quickly stopped. Moreover, even if in this state any external force should act upon the swiveling body 62, the swiveling body 62 does not rotate. The above operation is the same even if the swiveling body was driven in the reverse rotational direction. It is to be noted that a crossover load relief valve (not shown) that starts operation when the braking pressure described above exceeds the predetermined pressure value becomes is provided between the conduits 6A and 6B (2) Neutral Free Mode When the neutral free mode is selected by the mode changeover switch 13 and initial actuation is applied to the operating lever 5 towards the forward rotation side for forward rotation of the swiveling body, in the same manner as described above, the direction control valve 1 is changed over to its position (a), and the hydraulic motor 2 is rotated in the forward rotational direction. At this time the target flow amount QAB becomes >0, since the signal S1 output from the rotational speed sensor 11 is positive (>0) , and further the differential signal $\Delta P$ becomes <0 since P1>P2 (referring to the signals P1 and P2 output from the pressure sensors 10A and 10B) . As a result processing is performed using the conversion table 24B so as to bring the control signal A' equal to 0 as a limit, and this control signal A'=0 is output to the electromagnetic proportional valve 9 just as it is. On the other hand, if initially the operating lever 5 is actuated towards the reverse rotation side, the target flow amount QAB becomes <0, since the signal S1 output from the rotational speed sensor 11 is negative (<0), and further the differential signal $\Delta P$ becomes >0 since P1<P2 (referring to the signals P1 and P2 output from the pressure sensors 10A and 10B) As a result processing is performed using the conversion table 24A so as to bring the control signal A' equal to 0 as a limit, and this control signal A'=0 is output to the electromagnetic proportional valve 9. In this manner a control signal A'=0 is output to the electromagnetic control valve 9 during initial starting, and communication between the conduits 6A and 6B is cut off in the same manner as the previously described neutral brake mode, and the swiveling body 62 is driven at a speed according to the amount of actuation of the operating lever 5. Moreover, when the operating lever is kept at a fixed position to the forward rotation side or to the reverse rotation side, and also when the operating lever is operated to accelerate, in the same manner, a control signal A'=0 is output to the electromagnetic proportional valve 9.

The difference between the neutral free mode and the neutral brake mode is when as described below the operating lever 5 is operated to decelerate or to stop. When during forward rotation the operating lever 5 is actuated to the neutral position so as to stop the movement of the swiveling body 62, the pilot pressure to the direction control valve 1 drops and the direction control valve 1 is driven to the neutral position, and the pressure in the conduit 6B increases. At this time, although the target flow amount QAB is >0 since the signal output from the rotational speed sensor 11 is positive, the differential signal ΔP>0 since P1<P2 (referring to the signals P1 and P2 output from the pressure sensors 10A and 10B), and a control signal A'>0 is calculated by the control table 24A, and this control signal A' is output to the electromagnetic proportional valve 9. As a result, the electromagnetic proportional valve 9 is opened to a specified amount, and a flow amount corresponding to the target flow amount QAB flows from the conduit 6B to the conduit 6A via the electromagnetic proportional valve 9. Due to this the hydraulic pressure in the conduit 6B is reduced, and braking force does not act upon the hydraulic motor 2 so that the swiveling body 62 continues rotating by inertial force. It is to be noted that since in practice swiveling resistance as well acts upon the swiveling body 62 rotating in this manner, as shown by the solid line in FIG. 4B the driving of the swiveling body 62 stops in due course. If the driving of the swiveling body 62 is to be forcibly stopped, it is acceptable to actuate the operating lever 5 to the reverse side (so called "reverse lever"), so as to increase the hydraulic pressure in the conduit 6B.

In this manner according to the first embodiment it is always possible to realize a suitable one of the neutral free/neutral brake states without any dependence upon the actuation position of the operating lever 5, since the electromagnetic proportional valve 9 is provided which communicates together the input and output ports of the hydraulic motor 2 and cuts them off from one another, and it is arranged that the valve opening amount of the electromagnetic proportional valve 9 is controlled based upon the rotational speed of the swiveling body 62 and the forward and reverse differential pressure of the hydraulic motor 2, and based upon the neutral brake/neutral free mode. Furthermore the control algorithm becomes simple, since the target flow amount QAB is calculated by the controller 12 and it is arranged that the control signal A' is output according to this target flow amount QAB. Yet further, since in the neutral free mode it is arranged that the flow amount passing through the electromagnetic proportional valve 9, i.e. the flow amount supplied to the hydraulic motor 2, is directly controlled, the accuracy of speed control of the swiveling body is improved, as compared with indirect control of the flow amount supplied to the hydraulic motor by pressure control of the relief valve.

The second embodiment

Figure 5:
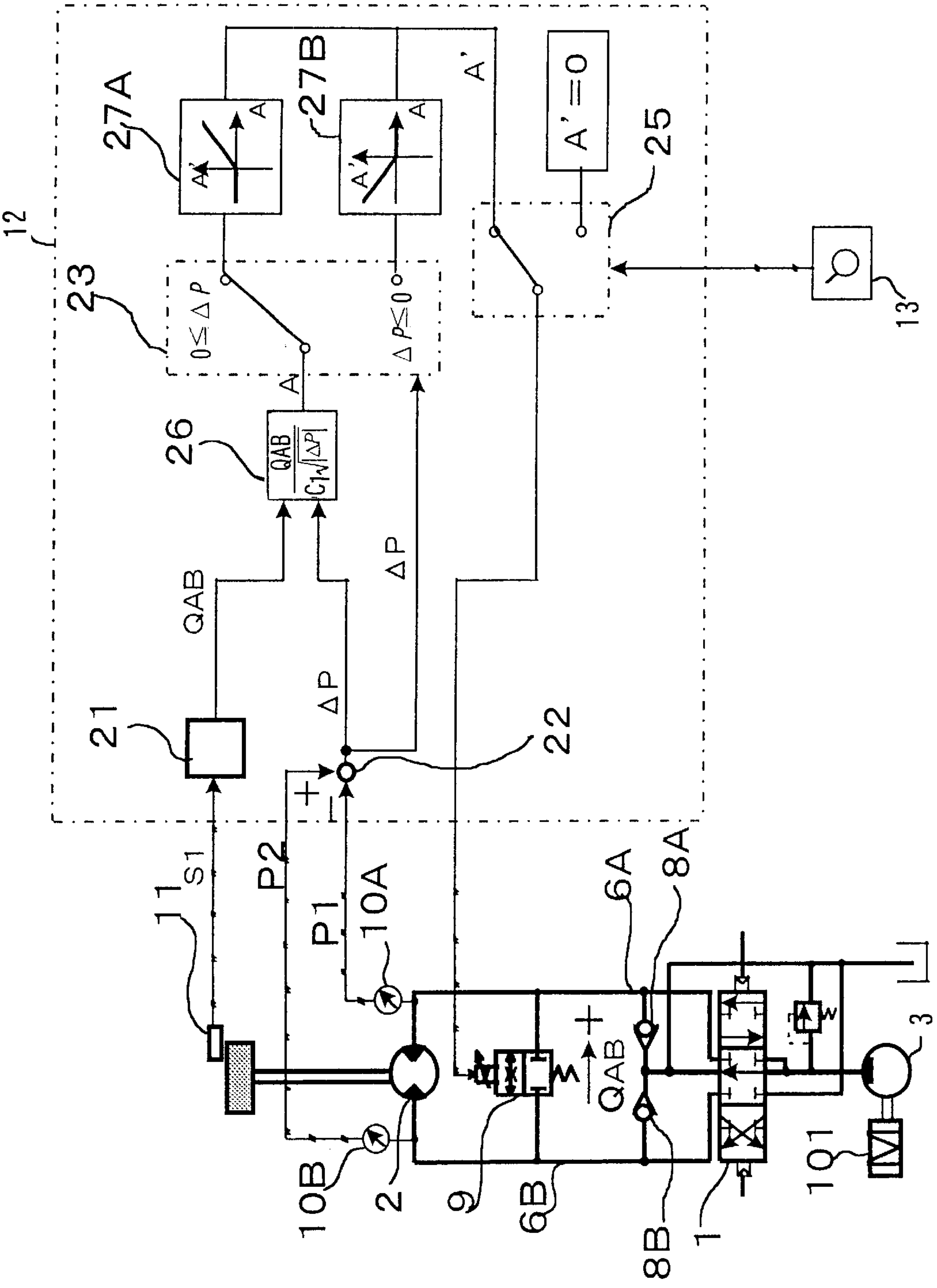
FIG. 5 shows the detailed construction of a control section of a swivel control apparatus according to a second embodiment.

FIG. 5 is a hydraulic circuit diagram showing the construction of a hydraulic control apparatus according to a second embodiment of this invention. It should be understood that to elements which are identical to ones shown in FIGS. 1 and 2 identical reference symbols are attixed, and in the following principally the points of difference will be explained. As shown in FIG. 5, the second embodiment differs from the first embodiment by the method for calculation of the control signal to A'. That is, by contrast to the first embodiment in which the control signal A' was derived from the target flow amount QAB using the conversion tables 24A and 24B, in the second embodiment the control signal A is calculated from the pressure signal ΔP and the target flow amount QAB using an equation for calculation (I), as will be explained below.

Referring to FIG. 5, the calculation shown in Equation (I) is performed in a opening amount calculation device 26, based upon the target flow amount QAB calculated by a flow amount calculation device 21 and the differential signal ΔP calculated by a subtraction device 22, and the valve opening amount A (in the following this will be termed the "target opening amount") for the electromagnetic proportional valve 9 is calculated which is necessary for the flow of this target flow amount QAB. $A=Cl\times QAB/\sqrt{|\Delta P|}$ . . . (I), where Cl is a constant.

The above equation (I) is a variant of a following equation (II) which is a general type of equation regarding orifice, in which the flow amount Q passing through the orifice corresponds to the target flow amount QAB, and the differential pressure of orifice Δp corresponds to the differential signal ΔP. $Q=C2\times A\sqrt{(2\times\Delta p/\rho)}$ . . . (II), where C2 is a constant and ρ is the density.

The target opening amount A calculated in this manner is converted into a control signal A' which corresponds to the target opening amount A by a limit processor 27A or 27B. At this time, limit processing for the control signal A'=0 is performed in the region of the limit processor 27A where the target opening amount A≦0, and in the region of the limit processor 27B where the target opening amount A≧0.

The operation of the second embodiment constituted in this manner is basically identical to that of the first embodiment. However, since with the second embodiment the target opening amount A is calculated while considering not only the target flow amount QAB but also the differential pressure signal ΔP, therefore it is possible to cause the target flow amount QAB to flow in the electromagnetic proportional valve 9 with high accuracy.

The third embodiment

Figure 6:
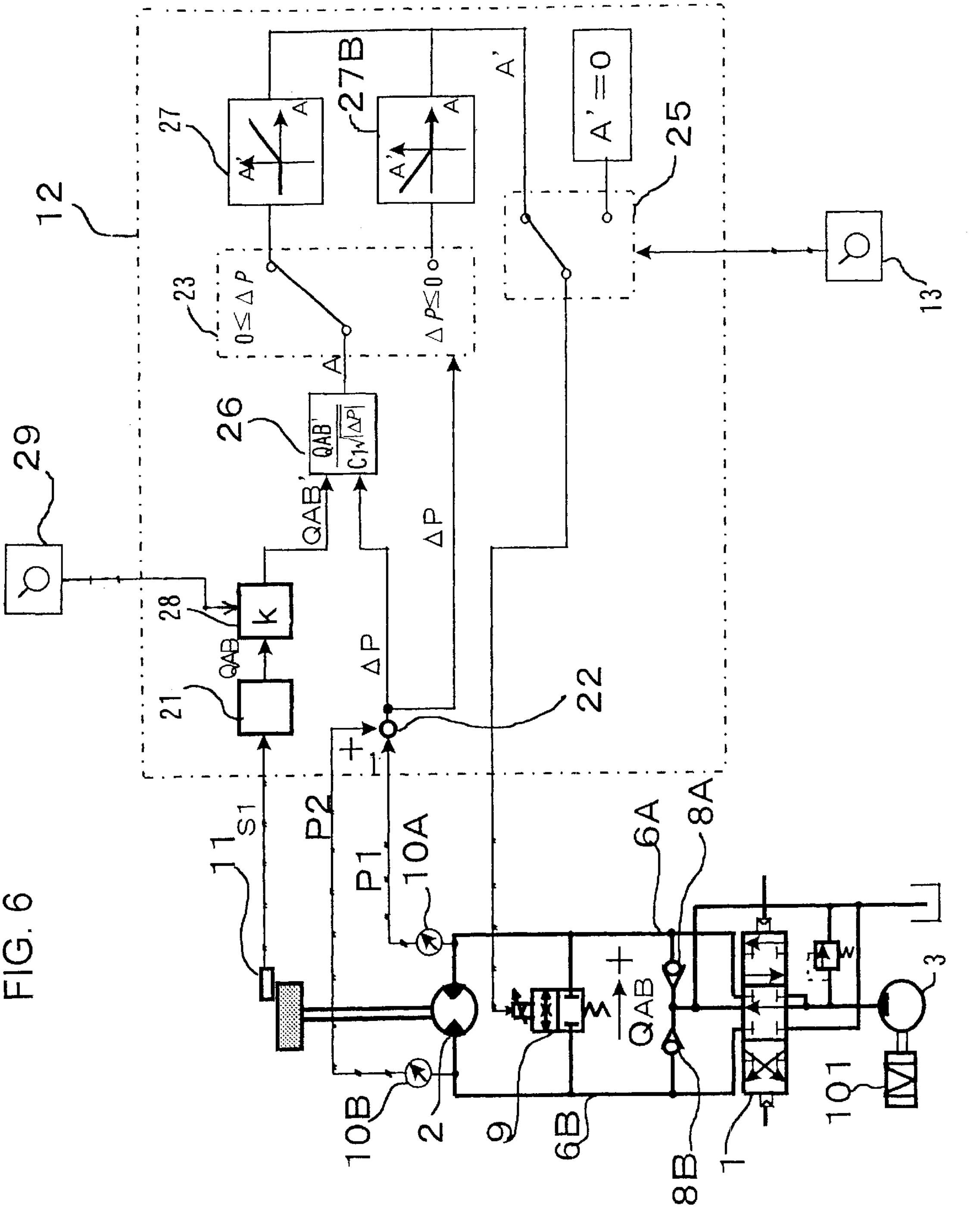
FIG. 6 shows the detailed construction of a control section of a swivel control apparatus according to a third embodiment.

FIG. 6 is a hydraulic circuit diagram showing the construction of a hydraulic control apparatus according to a third embodiment of this invention. It should be understood that to elements which are identical to ones shown in FIG. 5 identical reference symbols are attixed, and in the following principally the points of difference will be explained. As shown in FIG. 6, the third embodiment differs from the second embodiment in the points that a gain setting device 29 on which the operator can adjust a gain to any value, and a multiplication device 28 which inputs a signal from the gain setting device 29 and calculates a gain flow amount QAB' (=K×QAB) by multiplying the target flow amount QAB by the gain K are provided; and in the third embodiment the control signal A' is calculated based not upon the flow amount QAB but upon the gain flow amount QAB'. Moreover, in this case, the gain K is set to within the region 0≦K≦1, and accordingly the gain flow amount QAB' satisfies the condition 0≦QAB' <QAB.

Figure 7A:
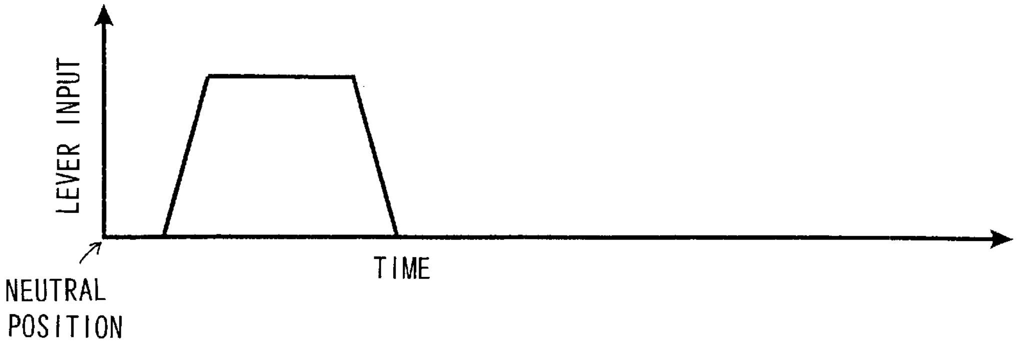
FIGS. 7A and 7B show an example of swiveling speed versus swivel control apparatus operating lever input for the third embodiment.
Figure 7B:
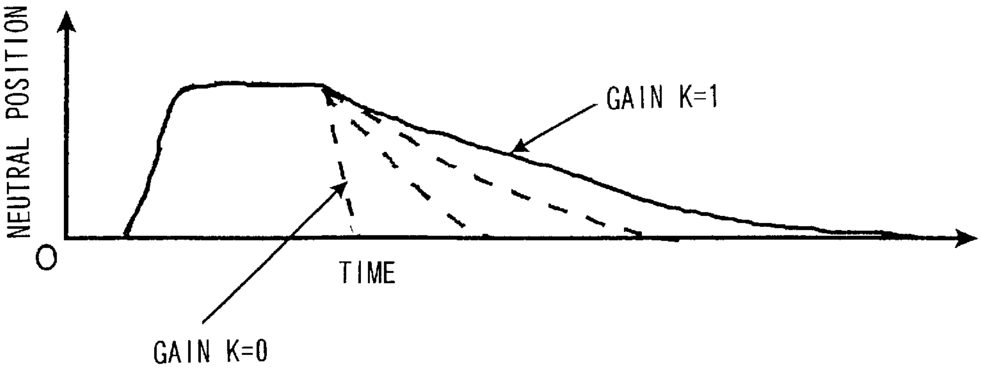

With the third embodiment structured in this manner, the deceleration of the swivel speed may be varied during the neutral free mode by adjusting the gain K, as shown for example in FIGS. 7A and 7B. Referring to FIG. 7B, when the gain K is set to 0, the gain flow amount QAB' becomes 0, and in this situation, in the same manner as during the neutral brake mode, the electromagnetic proportional valve 9 is closed and the swiveling body 62 quickly decelerates in response to the input state of the operating lever 5. Further, when the gain K is set to 1, the gain flow amount QAB' becomes equal to the target flow amount QAB, and in this situation the valve opening of the electromagnetic proportional valve 9 becomes equal to the target opening amount A of the second embodiment, and the swiveling body 62 rotates by inertial force, even if the operating lever 5 is actuated for deceleration.

Since in this manner, according to this third embodiment, it is so arranged that the gain flow amount QAB' is calculated by multiplying the target flow amount QAB by any value of the gain K, and the control signal A' is calculated based upon this gain flow amount QAB', therefore it is possible freely to alter the deceleration during the neutral free mode, and due to this it is possible easily to satisfy the demands of an operator who wishes to alter the deceleration feeling, so that the convenience of use is enhanced.

It should be understood that, although the swivel control apparatus according to the above described embodiments may be applied to a crane, it can also be applied in an identical manner to a hydraulic shovel. Further, although in the above described embodiments it was so arranged that, during the neutral free mode, hydraulic oil flowed from the conduit 6A (6B) to the conduit 6B (6A) using the electromagnetic proportional valve 9 in correspondence to the target flow amount QAB or the gain flow amount QAB', it is also possible to realize the neutral free mode simply without calculating any target flow amount QAB or gain flow amount QAB', just by permitting flow from the conduit 6A (6B) to the conduit 6B (6A).

Further, although in the above described embodiments it was so arranged that the pressures in the conduits 6A and 6B are controlled by using the electromagnetic proportional valve 9, any structures that enable the pressures in the conduits 6A and 6B increase or decrease may be adopted. Furthermore, although in the above described embodiments the rotational speed sensor 11 was used to calculate the target flow amount QAB, the speed sensor may be used. Also, although in the above described embodiments the control algorithm of the controller 12 was explained in the example of hardware by using the block diagram, this is for convenience in explanation. The control algorithm is actually executed in the software manner.

What is claimed is:

1. A swivel control apparatus, comprising:

a hydraulic pump;

a hydraulic motor for swiveling which is driven by hydraulic oil emitted from said hydraulic pump;

a control valve which controls a flow of hydraulic oil which is supplied from said hydraulic pump to said hydraulic motor for swiveling, and at a neutral position of the control valve cuts off from one another a pair of ports which communicate to input and output ports of said hydraulic motor;

a valve device which communicates and cuts off from one another a pair of conduits which are respectively connected to the input and output ports of said hydraulic motor for swiveling;

a pressure detection device which detects respective pressures in said two conduits and outputs pressure signals;

a rotational speed detection device which detects a physical quantity based upon a rotational speed of said hydraulic motor for swiveling and outputs a rotational speed signal;

a mode selection device which selects a neutral brake mode and a neutral free mode; and a control device which controls driving of said valve device so as to cut off said two conduits from one another when said neutral brake mode is selected, and so as to communicate said two conduits based upon said pressure signals and said rotational speed signal when said neutral free mode is selected.

2. A swivel control apparatus according to claim 1, wherein said control device calculates a direction of action of hydraulic oil upon said hydraulic motor based upon said pressure signals, calculates a rotational direction of said hydraulic motor based upon said rotational speed signal, and controls the driving of said valve device so as to communicate said two conduits when said neutral free mode is selected and a calculated direction of action of hydraulic oil upon said hydraulic motor and the rotational direction of said hydraulic motor are different.

3. A swivel control apparatus according to claim 2, wherein said control device calculates a target flow amount based upon said rotational speed signal, and controls the driving of said valve device so that said target flow amount flows from one of said conduits to the other of said conduits.

4. A swivel control apparatus according to claim 3, further comprising a deceleration ratio setting device which sets a deceleration ratio for said hydraulic motor for swiveling, wherein said control device calculates said target flow amount based upon a set value from said deceleration ratio setting device.

5. A swivel control apparatus according to claim 3, wherein said control device controls the driving of said valve device based upon a conversion table that is predetermined to obtain a value of a control signal for said valve device based upon said target flow amount.

6. A swivel control apparatus according to claim 3, wherein said target flow amount is assumed as a value for a flow amount passing through an orifice, a differential pressure between said two conduits detected by said pressure detection device is assumed as a value for a differential pressure of orifice said control device calculates an opening amount of orifice by substituting the assumed values into an equation based upon the orifice equation, and controls the driving of said valve device based upon a control signal corresponding to the calculated opening amount of orifice.

7. A swivel control apparatus according to claim 1, wherein said valve device is an electromagnetic proportional valve and is controlled so as to be closed when said neutral brake mode is selected and so as to be opened with a predetermined opening area when said neutral free mode is selected.

8. A hydraulic swiveling type of crane comprising:

a traveling body;

a swiveling body that is mounted upon said traveling body to be able to swing; and a swivel control apparatus that controls swiveling of said swiveling body, wherein said swivel control apparatus comprises:

a hydraulic pump;

a hydraulic motor for swiveling which is driven by hydraulic oil emitted from said hydraulic pump;

a control valve which controls a flow of hydraulic oil which is supplied from said hydraulic pump to said hydraulic motor for swiveling, and at a neutral position of the control valve cuts off from one another a pair of ports which communicate to input and output ports of said hydraulic motor;

a valve device which communicates and cuts off from one another a pair of conduits which are respectively connected to the input and output ports of said hydraulic motor for swiveling;

a pressure detection device which detects respective pressures in said two conduits and outputs pressure signals;

a rotational speed detection device which detects a physical quantity based upon a rotational speed of said hydraulic motor for swiveling and outputs a rotational speed signal;

a mode selection device which selects a neutral brake mode and a neutral free mode; and a control device which controls driving of said valve device so as to cut off said two conduits from one another when said neutral brake mode is selected, and so as to communicate said two conduits based upon said pressure signals and said rotational speed signal when said neutral free mode is selected.

* * * * *